United States Patent Office 3,801,569
Patented Apr. 2, 1974

3,801,569
7-(1,1-DIFLUOROALKYL)-1,4-BENZODIAZEPINES
Robert Ye-Fong Ning, West Caldwell, and Leo Henryk Sternbach, Upper Montclair, N.J., assignors to Hoffmann-La Roche Inc., Nutley, N.J.
No Drawing. Filed Jan. 15, 1973, Ser. No. 323,549
Int. Cl. C07d 53/06
U.S. Cl. 260—239.3 D          11 Claims

ABSTRACT OF THE DISCLOSURE

The present invention relates to benzodiazepines bearing a lower alkyl-$CF_2$-group in position-7 and processes for preparing the foregoing.

DETAILED DESCRIPTION OF THE INVENTION

The present invention relates to compounds selected from the group consisting of compounds of the formula (I)

and pharmaceutically acceptable salts thereof
wherein A is selected from the group consisting of $$\diagdown C=N\diagup \quad \diagdown CH-N\diagup \quad \diagdown C=N\diagup$$

$R_1$ is a $C_1$–$C_7$, preferably a $C_1$–$C_3$ lower alkyl grouping,
$R_2$ is hydrogen and lower alkyl,
$R_3$ is selected from the group consisting of hydrogen and lower alkyl and $R_4$ is selected from the group consisting of hydrogen and halogen.

An especially preferred class of compounds encompassed by the Formula I are those wherein A is the $$\diagdown C=N\diagup$$

grouping, i.e. compounds of the formula (II)

wherein $R_1$, $R_2$, $R_3$ and $R_4$ are as above.

In addition to the compounds within the scope of Formulas I and II above, there are also encompassed by the present invention the pharmaceutically acceptable salts of said compounds. The compounds of the Formulas I and II above form pharmaceutically acceptable acid addition salts with inorganic and organic acids, e.g. hydrohalic acids such as hydrochloric acid and hydrobromic acid, other mineral acids such as sulfuric acid, phosphoric acid, nitric acid, and the like or with organic acids such as tartaric acid, citric acid, camphorsulfonic acid, m-ethanesulfonic acid, toluenesulfonic acid, acetic acid and the like.

As used in this disclosure, the terms hereinbelow defined have the following significance:

The term "lower alkyl" used alone or in combination with another radical refers to a straight or branched chain hydrocarbon group having 1–7, most preferably, 1–3 carbon atoms in the chain such as methyl, ethyl, propyl, isobutyl, isopropyl, butyl and the like.

The term "halogen" as used herein includes all four forms thereof, i.e. chlorine, bromine, iodine and fluorine.

Preferred for the purposes of the present invention are compounds of the Formula I or II above wherein $R_1$ is methyl. Also preferred are compounds of the Formula I or II above wherein $R_2$ is hydrogen or methyl. Preferred compounds of the Formula I or II above also include those wherein $R_3$ is hydrogen. $R_4$ is preferably in the 2-position of the 5-phenyl ring and is advantageously hydrogen, chlorine or fluorine, most preferably, fluorine. Thus, particularly preferred are compounds of the Formula I above wherein $R_1$ is methyl, $R_2$ is hydrogen or methyl, $R_3$ is hydrogen and $R_4$ is hydrogen, chlorine or fluorine, preferably fluorine.

Compounds of the Formula II above can be prepared starting with the corresponding compounds of the formula (III)

wherein $R_1$, $R_2$, $R_3$ and $R_4$ are as above by treating a compound of the Formula III above with a reagent capable of affecting the direct fluorination of the carbonyl moiety in position-7.

Any reagent which is capable of effecting direct fluorination of the carbonyl group in position-7 of a compound of the Formula III above whereby the corresponding compound of the Formula II above is obtained is suitable for the purposes of the present invention. Among the many compounds that can effect direct fluorination, there can be included molybdenumhexafluoride, sulfur tetrafluoride, phenylsulfur trifluoride and the like with conditions selected to accommodate the reagent utilized in accordance with prior art procedure.

Suitably the direct fluorination reaction is effected in the presence of an inert organic solvent. All that is required of the solvent is that the starting material of the Formula III above be soluble therein and that the solvent does not interfere with the ensuing reaction. Among the solvents suitable for the purposes of the invention there can be included haloalkanes, such as methylene chloride, 1,2-dichloroethane and the like and mixtures of these.

Temperature and pressure are not critical to a successful performance of the conversion of a compound of Formula III above to the corresponding compound of the Formula II above. However, it is prefered to effect the ensuing reaction at a temperature of from about −20° to about 60°, most preferably from about 0° to about 30°, most suitably at about room temperature.

The compounds of the Formula I and II above wherein $R_2$ is hydrogen can be converted into the corresponding compounds of the Formula I or II above wherein $R_2$ is lower alkyl by a wide variety of techniques. For example, a compound of the Formula I or II above wherein $R_2$ is hydrogen can be converted into the corresponding compound of the Formula I or II above wherein $R_1$ is lower alkyl by reacting a compound of the Formula I or II wherein $R_1$ is hydrogen with a sodio salt forming derivative, such as sodium methoxide, sodium hydride and the like whereby to obtain the 1-sodio derivative of a compound of the Formula I or II above wherein $R_2$ is hydrogen and then treating the so-obtained sodio derivative with a di-lower alkyl sulfate, e.g. methylsulfate, a lower alkyl halide, e.g. methyl iodide and the like. When proceeding accordingly, alkylation in the 1-position of a compound of the Formula I or II above occurs. For example, when dimethylsulfate or methyl iodide is utilized, a compound of the Formula I or II above wherein $R_2$ is hydrogen is converted into the corresponding compound wherein $R_2$ is methyl. Sodium methoxide, sodium hydride and the like is utilized to form the 1-sodio derivative and the so-obtained 1-sodio derivative is reacted with an equivalent amount of an alkylating agent whereby the corresponding compound of the Formula I or II above is obtained bearing only a substituent in the 1-position.

Compounds of the Formula II above can be reduced catalytically to the corresponding tetrahydro compound of the Formula I above, i.e. a compound of the formula I wherein A is the grouping

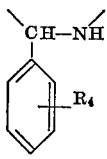

with a suitable reducing system, e.g. hydrogenation in the presence of platinum oxide catalysts and the like. Suitably this reaction is effected in the presence of an inert organic solvent such as lower alkanol, e.g. methanol, ethanol and the like; ethers, such as diethyl ether, tetrahydrofuran and the like in accordance with usual procedures.

Compounds of the Formula I above wherein A is the grouping

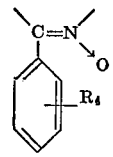

i.e. compounds of the formula

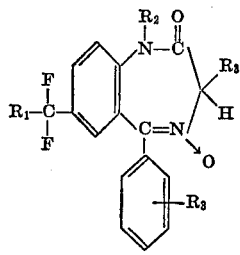

wherein $R_1$, $R_2$, $R_3$ and $R_4$ are as above can be prepared from the corresponding compound of the Formula II above by treating the said compound of the Formula II above dispersed in an inert organic solvent with an oxidizing agent capable of providing an N-oxide grouping. Among the many suitable inert organic solvents, there can be included halogenated hydrocarbons such as methylene chloride. As oxidizing agents, there can be utilized peracid oxidizing agents such as chloroperbenzoic acid, peracetic acid and the like.

The compounds of the Formula I and obviously of the Formula II included within the scope of Formula I above are useful as muscle relaxants, sedatives and anticonvulsants. They can be embodied in pharmaceutical dosage formulations containing from about 0.5 mg. to about 200 mg. of active substance with dosage adjusted to species and individual requirements (parenteral formulations would ordinarily contain less of the active substance than compositions intended for oral administration). The compounds of the Formula I or II above can be administered alone or in combination with pharmaceutically acceptable carriers as indicated above in a wide variety of dosage forms. For example, solid preparation for oral administration include tablets, capsules, granules, emulsions, suspensions and the like. The solid preparations may comprise an inorganic carrier, e.g. talc or an organic carrier, e.g. lactose and starch. Additives, such as mangesium stearate (a lubricant) can also be included. Liquid preparations such as solutions, suspensions or emulsions may comprise the usual diluents, such as water, petroleum jelly and the like, a suspension medium such as a polyoxyethylene glycol and similar excipients. The dosage formulations may contain other additional ingredients, such as preserving agents, stabilizing agents and wetting agents.

The following examples are illustrative but not limitative of the present invention. All temperatures are stated in degrees centigrade.

Example 1

To a 0° solution of 2.00 g. (6.74 mmoles) of 7-acetyl-1,3-dihydro - 5 - (2-fluorophenyl)-2H-1,4-benzodiazepin-2-one in 50 ml. of methylene chloride, was added, under nitrogen, with stirring, over 5 min., 17.5 ml. of a commercial methylene chloride solution of molybdenum hexafluoride (0.8 molar; 14 mmoles). The mixture was allowed to warm up to room temperature while stirring was continued. After 24 hrs., the mixture was partitioned between 100 ml. each of methylene chloride and 6 M aqueous ammonia. The methylene chloride layer was washed with water, dried over anhydrous sodium sulfate, then evaporated to dryness. The residual gum (2 g.) was separated by preparative thin-layer chromatography (20 silica gel plates measuring 20 cm. x 20 cm. x 1.5 mm. were used, the eluent was ethyl acetate). 7-(1,1-difluoroethyl)-1,3-dihydro - 5 - (2 - fluorophenyl)-2H-1,4-benzodiazepin-2-one (Rf 0.64) was isolated as a solid foam upon evaporation of 1:9 (v./v.) mixture of methanol-ethyl acetate which was used to strip the product off the bands of silica gel scraped off the plates. Upon crystallization from ethanol, the product as faintly yellow prisms was obtained, M.P. 210–212°. Recrystallization from ethanol removed the color, however, the M.P. remained unchanged.

In a manner analogous to that described above, 7-(1,1-difluoropropyl) - 1,3 - dihydro-5-(2-fluorophenyl)-2H-1,4-benzodiazepin-2-one can be prepared from 1,3-dihydro-5-(2 - fluorophenyl) - 7 - propionyl-2H-1,4-benzodiazepin-2-one; 5 - (2 - chlorophenyl) - 7 - (1,1-difluoroethyl)-1,3-dihydro-2H-1,4-benzodiazepin-2-one can be prepared from 7 - acetyl - 5 - (2-chlorophenyl)-1,3-dihydro-1,4-benzodiazepin-2-one; 7-(1,1-difluoroethyl)-1,3-dihydro-5-phenyl-2H-1,4-benzodiazepin-2-one can be prepared from 7-acetyl-1,3-dihydro - 5 - phenyl - 2H - 1,4-benzodiazepin-2-one; 7-(1,1-difluoroethyl) - 1,3 - dihydro - 1 - methyl-5-phenyl-2H-1,4-benzodiazepin-2-one can be prepared from 7-acetyl - 1,3 - dihydro - 1 - methyl - 5 - phenyl-2H-1,4-benzodiazepin-2-one.

Example 2

To a stirred solution of 1.6 g. (5 mmoles) of 7-(1,1-difluoroethyl) - 1,3 - dihydro - 5 - (2-fluorophenyl)-2H-1,4-benzodiazepin-2-one in 25 ml. of dimethylformamide (nitrogen atmosphere) was added 0.24 g. (5.6 mmoles) of 56% sodium hydride in mineral oil. The reaction mixture was stirred for 5 min. at room temperature. To the slurry was added 0.38 ml. (6 mmoles) of methyl iodide. The mixture was stirred for 15 min. more at room temperature then diluted with ice water, made slightly acidic with dilute hydrochloric acid and extracted with methylene chloride. The organic layer was separated, dried and concentrated to dryness. The residual gum was separated by preparative thin-layer chromatography (20 silica gel plates, measuring 20 cm. x 20 cm. x 1.5 mm. were used, the eluent was ethyl acetate). 7-(1,1-difluoroethyl)-1,3-dihydro - 1 - methyl-5-(2-fluorophenyl)-2H-1,4-benzodiazepin-2-one (Rf about 0.8) was isolated and crystallized from acetone-hexane.

In an analogous manner, 7-(1,1-difluoropropyl)-1,3-dihydro - 5 - (2 - fluorophenyl) - 1 - methyl-2H-1,4-benzodiazepin - 2 - one and 7-(1,1-difluoroethyl)-1,3-dihydro-1-methyl-5-phenyl-2H-1,4-benzodiazepin-2-one can be prepared.

Example 3

A solution of 800 mg. (2.5 mmoles) of 7-(1,1-difluoroethyl) - 1,3 - dihydro - 5 - (2-fluorophenyl)-2H-1,4-benzodiazepin-2-one in 50 ml. of tetrahydrofuran was added 700 mg. of platinum oxide. The mixture was hydrogenated under one atmosphere of hydrogen for 8 hrs. The catalyst was removed by filtration. The filtrate was evaporated to dryness. The residue yielded 7-(1,1-difluoroethyl)-5-(2-fluorophenyl) - 1,3,4,5 - tetrahydro - 2H - 1,4 - benzodiazepin-2-one on crystallization from acetone-hexane.

In a similar manner, 7-(1,1-difluoropropyl)-5-(2-fluorophenyl) - 1,3,4,5 - tetrahydro - 2H - 1,4 - benzodiazepin-2-one can be prepared from 7-(1,1-difluoropropyl)-1,3-dihydro - 5 - (2-fluorophenyl)-2H-1,4-benzodiazepin-2-one; 7 - (1,1 - difluoroethyl) - 5 - phenyl - 1,3,4,5 - tetrahydro-2H-1,4-benzodiazepin-2-one can be prepared from 7-(1,1-difluoroethyl) - 1,3 - dihydro - 5 - phenyl-2H-1,4-benzodiazepin-2-one; and 7-(1,1-difluoroethyl)-1-methyl-5-phenyl-1,3,4,5-tetrahydro-2H-1,4-benzodiazepine can be prepared from 7-(1,1-difluoroethyl)-1,3-dihydro-1-methyl-5-phenyl-2H-1,4-benzodiazepin-2-one.

Example 4

To a stirred solution of 0.96 g. (3 mmoles) of 7-(1,1-difluoroethyl) - 1,3 - dihydro - 5 - (2 - fluorophenyl)-2H-1,4-benzodiazepin-2-one in 10 ml. of methylene chloride was added 600 mg. (3 mmoles) of m-chloroperbenzoic acid (85% pure). The reaction mixture was stirred at room temperature for one day. m-Chloroperbenzoic acid was removed by washing of the methylene chloride solution with aqueous sodium bicarbonate. The crude product mixture, obtained after evaporation of methylene chloride, afforded 7-(1,1-difluoroethyl)-1,3-dihydro-5-(2-fluorophenyl)-2H-1,4-benzodiazepin-2-one 4-oxide on crystallization from acetone-hexane.

In a similar manner, there can be prepared:

7 - (1,1 - difluoropropyl)-1,3-dihydro-5-(2-fluorophenyl)-2H - 1,4 - benzodiazepin-2-one 4-oxide from 7-(1,1-difluoropropyl) - 1,3 - dihydro - 5 - (2-fluorophenyl)-2H-1,4-benzodiazepin-2-one;

7 - (1,1 - difluoroethyl) - 1,3 - dihydro-5-phenyl-2H-1,4-benzodiazepin - 2 - one 4-oxide from 7-(1,1-difluoroethyl) - 1,3 - dihydro-5-phenyl-2H-1,4-benzodiazepin-2-one; and 7 - (1,1 - difluoroethyl) - 1,3 - dihydro - 1 - methyl-5-phenyl-2H-1,4-benzodiazepin-2-one 4-oxide from 7-(1,1-difluoroethyl) - 1,3 - dihydro - 1 - methyl-5-phenyl-2H-1,4-benzodiazepin-2-one.

Example 5

A parenteral formulation containing the following ingredients:

| | |
|---|---|
| 7 - (1,1 - difluoroethyl) - 1,3 - dihydro-5-(2-fluorophenyl)-2H-1,4-benzodiazepin-2-one _____mg__ | 2.0 |
| Propylene glycol _____cc__ | 0.4 |
| Benzyl alcohol (benzaldehyde free) _____cc__ | 0.15 |
| Ethanol 95% USP _____cc__ | 0.1 |
| Water for Injection, q.s. _____cc__ | 1.0 | was prepared (for 10,000 cc.) as follows:

(1) The 20 grams of the 7-(1,1-difluoroethyl)-1,3-dihydro - 5 - (2 - fluorophenyl)-2H-1,4-benzodiazepin-2-one were dissolved in the benzyl alcohol; 4,000 cc. of propylene glycol and 1,000 cc. of ethanol were added.

(2) The solution was brought up to final volume of 10,000 cc. with Water for Injection.

(3) The solution was filtered through an 0.2 Selas candle, filled into suitable size ampuls, gassed with nitrogen and sealed.

Example 6

A tablet formulation containing the following ingredients:

| | Mg. |
|---|---|
| 7 - (1,1 - difluoroethyl) - 1,3 - dihydro-5-(2-fluorophenyl)-2H-1,4-benzodiazepin-2-one _____ | 10.0 |
| Lactose _____ | 113.5 |
| Corn starch _____ | 70.5 |
| Pregelatinized corn starch _____ | 8.0 |
| Calcium stearate _____ | 3.0 |
| | 205.0 | was prepared as follows:

(1) The 7-(1,1-difluoroethyl)-1,3-dihydro-5-(2-fluorophenyl)-2H-1,4-benzodiazepin-2-one was mixed with the lactose, corn starch and pregelatinized corn starch in a suitable size mixer.

(2) The mix was passed through a Fitzpatrick Comminuting machine fitted with #1A screen and with knives forward.

(3) The mix was returned to the mixer and moistened with water to a thick paste. The moist mass was passed through a #12 screen and the moist granules were dried on paper lined trays at 110° F.

(4) The dried granules were returned to the mixer, the calcium stearate was added and mixed well.

(5) The granules were compressed at a table weight of 200 mg. using standard concave punches having a diameter of 5/16".

Example 7

A tablet formulation containing the following ingredients:

| | Mg. |
|---|---|
| 7 - (1,1-difluoroethyl)-1,3-dihydro-5-(2-fluorophenyl)-2H-1,4-benzodiazepin-2-one _____ | 25.00 |
| Lactose, USP _____ | 64.50 |
| Corn starch _____ | 10.00 |
| Magnesium stearate _____ | 0.50 | was prepared as follows:

(1) The 7-(1,1-difluoroethyl)-1,3-dihydro-5-(2-fluorophenyl)-2H-1,4-benzodiazepin-2-one was mixed with the lactose, corn starch and magnesium stearate in a suitable mixer.

(2) The mixture was further blended by passing through a Fitzpatrick Comminuting machine fitted with a #1A screen with knives forward.

(3) The mixed powders were slugged on a tablet compressing machine.

(4) The slugs were comminuted to a mesh size (#16 screen) and mixed well.

(5) The tablets were compressed at a tablet weight of 100 mg. using tablet punches having a diameter of approximately 1/4". (Tablets may be either flat or biconvex and may be scored if desired.)

Example 8

A capsule formulation containing the following ingredients:

| | Mg. |
|---|---|
| 7-(1,1-difluoroethyl)-1,3-dihydro-5-(2-fluorophenyl)-2H-1,4-benzodiazepin-2-one _____ | 25 |
| Lactose _____ | 158 |
| Corn starch _____ | 37 |
| Talc _____ | 5 |
| | 225 | was prepared as follows:

(1) The 7-(1,1-difluoroethyl)-1,3-dihydro-5-(2-fluorophenyl)-2H-1,4-benzodiazepin-2-one was mixed with the lactose and corn starch in a suitable mixer.

(2) The mixture was further blended by passing through a Fitzpatrick Comminuting machine with a #1A screen with knives forward.

(3) The blended powder was returned to the mixer, the talc added and blended thoroughly. The mixture was then filled into #4 hard shell gelatin capsules on a Parke Davis capsulating machine. (Any similar type machine may be used.)

Example 9

A capsule formulation containing the following ingredients:

| | Mg. |
|---|---|
| 7-(1,1-difluoroethyl)-1,3-dihydro-5-(2-fluorophenyl)-2H-1,4-benzodiazepin-2-one | 50 |
| Lactose, USP | 125 |
| Corn starch, USP | 30 |
| Talc, USP | 5 |
| | 210 | was prepared as follows:

(1) The 7-(1,1-difluoroethyl)-1,3-dihydro-5-(2-fluorophenyl)-2H-1,4-benzodiazepin-2-one.

(2) The mixture was further blended by passing through a Fitzpatrick Comminuting machine with a #1A screen with knives forward.

(3) The blended powder was returned to the mixer, the talc added and blended thoroughly.

(4) The mixture was filled into #4 hard shell gelatin capsules on a Parke Davis capsulating machine.

We claim:

1. A compound of the formula

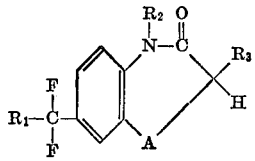

and pharmaceutically acceptable acid addition salts thereof wherein A is selected from the group consisting of

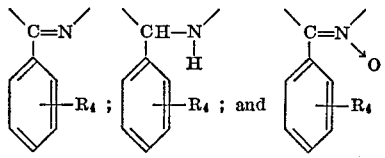

$R_1$ is a $C_1$–$C_7$ lower alkyl, $R_2$ is hydrogen and lower alkyl $R_3$ is selected from the group consisting of hydrogen and lower alkyl and R, is selected from the group consisting of hydrogen and halogen.

2. A compound as in claim 1 wherein $R_1$ is a $C_1$–$C_3$ lower alkyl grouping, $R_3$ is hydrogen and $R_4$ is joined to the 2-position of the phenyl ring.

3. A compound as in claim 2 wherein $R_2$ is hydrogen and $R_4$ is hydrogen, chlorine or fluorine.

4. A compound as in claim 1 wherein A is the grouping

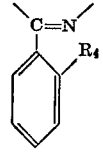

5. A compound as in claim 4 wherein A is the grouping

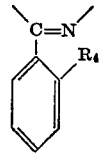

$R_1$ is a $C_1$–$C_3$ lower alkyl grouping and
$R_3$ is hydrogen.

6. A compound as in claim 5 wherein $R_2$ is hydrogen or methyl and $R_4$ is hydrogen, chlorine or fluorine.

7. A compound as in claim 6 wherein $R_1$ is methyl.

8. A compound as in claim 7 of the formula 7-(1,1-difluoroethyl) - 1,3 - dihydro-5-(2-fluorophenyl)-2H-1,4-benzodiazepin-2-one.

9. A compound as in claim 1 of the formula 7-(1,1-difluoropropyl) - 1,3 - dihydro-5-(2-fluorophenyl)-2H-1,4-benzodiazepin-2-one.

10. A compound as in claim 7 of the formula 7-(1,1-difluoroethyl) - 1,3-dihydro-5-phenyl-2H-1,4-benzodiazepin-2-one.

11. A compound as in claim 7 of the formula 5-(2-chlorophenyl)-7-(1,1-difluoroethyl)-1,3-dihydro-2H-1,4 - benzodiazepin-2-one.

References Cited
FOREIGN PATENTS
BSM839M  10/1961  France  260—239.3 D

JOHN D. RANDOLPH, Primary Examiner
R. T. BOND, Assistant Examiner

U.S. Cl. X.R.
424—244

UNITED STATES PATENT OFFICE
CERTIFICATE OF CORRECTION

Patent No. 3,801,569              Dated April 2, 1974

Inventor(s) Robert Ye-Fong Ning et al

It is certified that error appears in the above-identified patent and that said Letters Patent are hereby corrected as shown below:

Column 8, line 1, "and R, is selected" should read --and $R_4$ is selected--.

*Signed and Sealed this*

*fifteenth* Day of *June 1976*

[SEAL]

Attest:

RUTH C. MASON
*Attesting Officer*

C. MARSHALL DANN
*Commissioner of Patents and Trademarks*